United States Patent [19]
Klemm

[11] Patent Number: 5,097,585
[45] Date of Patent: Mar. 24, 1992

[54] METHOD OF FORMING A COMPOSITE TUBULAR UNIT BY EXPANDING, LOW-FREQUENCY INDUCTION HEATING AND SUCCESSIVELY QUENCHING

[75] Inventor: Robert E. Klemm, Milwaukee, Wis.

[73] Assignee: Construction Forms, Inc., Cedarburg, Wis.

[21] Appl. No.: 642,137

[22] Filed: Jan. 15, 1991

Related U.S. Application Data

[63] Continuation of Ser. No. 387,696, Jan. 31, 1989, abandoned.

[51] Int. Cl.[5] .................. B23P 11/02; B21D 39/20; H05B 6/06
[52] U.S. Cl. .......................... 29/523; 29/447; 29/507; 29/DIG. 24; 138/140; 219/8.5; 219/10.43
[58] Field of Search ............... 29/421.1, 446, 447, 29/522.1, 523, 507, DIG. 24; 138/140, 143, 148; 148/11.5 Q, 143, 144; 219/8.5, 10.43; 266/127; 285/381; 427/406

[56] References Cited

U.S. PATENT DOCUMENTS

| | | | |
|---|---|---|---|
| 3,914,481 | 10/1975 | Bostroem | 427/406 |
| 4,030,711 | 6/1977 | Siller | 148/144 X |
| 4,332,073 | 6/1982 | Yoshida et al. | 138/140 |
| 4,433,227 | 2/1984 | Brittin | 219/8.5 X |
| 4,449,281 | 5/1984 | Yoshida et al. | 29/421.1 |
| 4,598,857 | 7/1986 | Matsui | 29/447 X |

OTHER PUBLICATIONS

"Hardenability of Carbon and Alloy Steels", Jatczak, ASM Handbook, 9th Edition, vol. 1, Properties & Selection, pp. 471-472.
"Heat Treatment of Steel", Machinery's Handbook, 21st Edition, pp. 2140-2141.

*Primary Examiner*—Joseph M. Gorski
*Assistant Examiner*—Peter Dungba Vo
*Attorney, Agent, or Firm*—Andrus, Sceales, Starke & Sawall

[57] ABSTRACT

A multi-walled composite tube member is formed from two superimposed pipes having a gap therebetween. The inner pipe is forcibly expanded in excess of the gap to deform and expand the outer pipe. The expander including a mandrel is forced through the aligned pipes while maintaining the longitudinal alignment. The diameter of the mandrel corresponding to the final desired diameter to finally size the composite pipe section and establish a true round inner passage. An induction heating coil operating at a low frequency operating in the range of low hundreds hertz in contrast to a conventional high frequency unit operating at thousands of hertz is coupled to and moved relative to the expanded pipe unit, progressively heats small lengths of the expanded pipe unit. The expanded pipe unit is quenched with a chilled brine solution applied to both surfaces. The brine solution provides a rapid interchange of heat and hardening of the inner liner, while the application to both surfaces improves the hardening of the outer pipe wall. The composite pipe is formed in a single pass to avoid distortion which may occur on each of a plurality of heating passes, and to improve grain growth, minimize cracking and reduce energy consumption and cost.

12 Claims, 2 Drawing Sheets

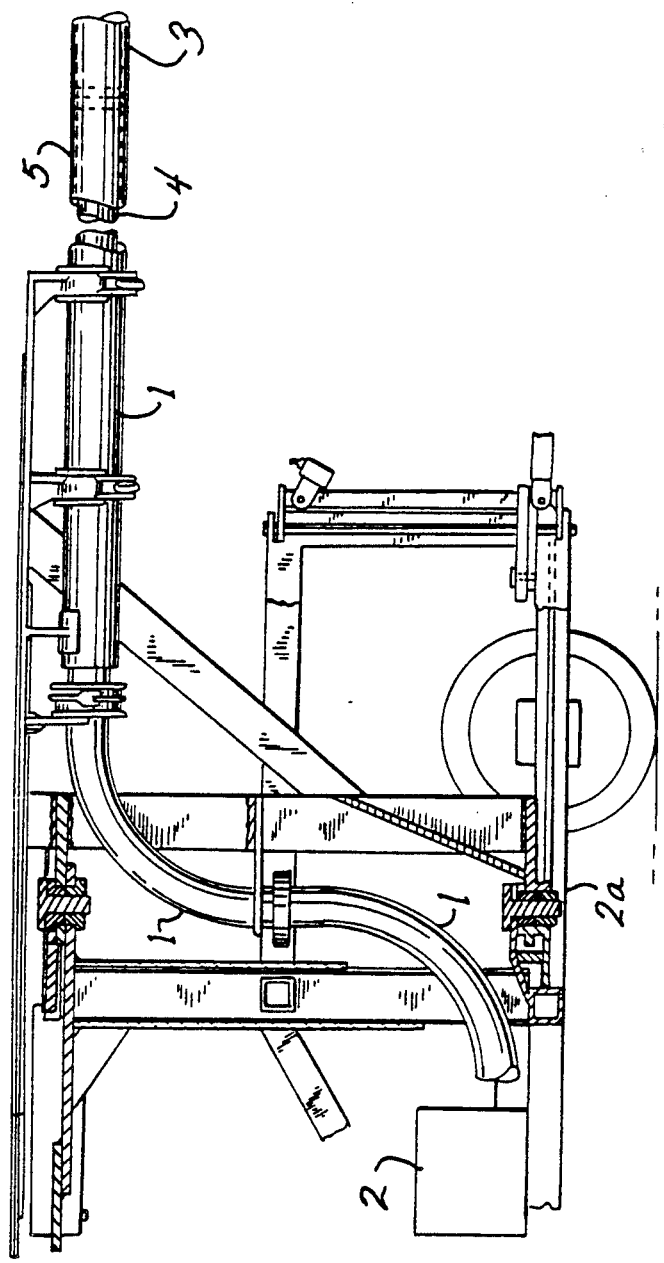
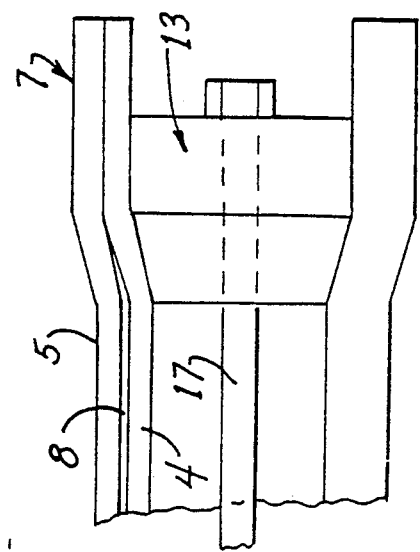
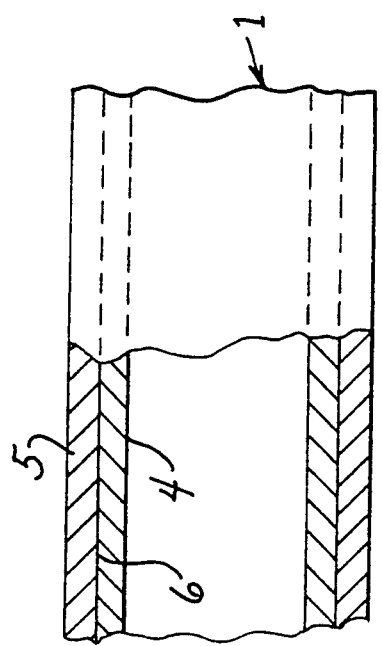

METHOD OF FORMING A COMPOSITE TUBULAR UNIT BY EXPANDING, LOW-FREQUENCY INDUCTION HEATING AND SUCCESSIVELY QUENCHING

This is application is a continuation of Ser. No. 07/387,696, filed Jan. 31, 1989, now abandoned.

BACKGROUND OF THE PRESENT INVENTION

This invention relates to the method of fabricating a multi-wall tubular member and particularly to such a multi-wall tubular member having a hardened inner wall and a high strength outer wall.

In various fluid systems, the piping and other tubular members may require an inner surface or wall having special specifications and requirements which are different than that of the surrounding outer wall. In such applications, a dual or multi-wall tubular member can be formed from two separate telescoped tubular members. Concrete pumping represents one application in which a dual wall specification is encountered. The abrasive characteristic of the concrete being pumped requires that the inner surface of the piping having a highly abrasive resistance characteristic. Generally, where metal piping is used, this requires an inner wall of a very hardened metal. Concrete pumping however also involves relatively high pressures, particularly pressure surges. This requires a pipe having a very high tensile strength to operate satisfactorily over long periods of time under normal pumping pressures. For example, pipe units which would advantageously be constructed as in such a composite pipe are truck mounted elongated pipe section for pumping concrete, such as shown in U.S. Pat. No. 3,860,175 which issued on Jan. 14, 1975 and is assigned to a common assignee with the present application. Various other applications encounter similar differential characteristic requirements. Oil well piping systems, nuclear power plants and various chemical flow systems require various special specifications for interior of the piping and contrast to a normally high strength requirement for the piping generally. Thus, one solution which has been disclosed and used commercially involves forming a composite multi-wall pipe from individual pipes or tubular members mounted in telescoped relation and specially processed to establish a firm interfaced engagement and connection between the two pipes. The inner pipe can then be formed with the necessary characteristics demanded by the particular product being transported. The outer pipe can be formed as a high strength member such that the pipe unit can withstand the pressures encountered under operating conditions.

U.S. Pat. No. 4,497,673 which issued Feb. 5, 1985 discloses a multi-wall pipe for applications in those systems requiring a hardened inner liner or wall. In accordance with the teaching of that patent, the tubular members are originally constructed to permit telescoping of the tubular members. After assembly, the inner liner is flame hardened causing the expansion of the inner liner into engagement with the outer liner or shell to form a composite member. The patent specifically teaches that the inner liner is provided with sequential heating and hardening to progressively expand the pipe and provide the desired interface interconnection. The flame hardening requires entry into the pipe with an appropriate torch unit for heating of the inner pipe to the necessary degree for hardening. U.S. Pat. No. 4,449,281 which issued May 22, 1984 discloses a alternate system. In this system or disclosure, cold water is introduced into the pipe, with the ends of the inner pipe sealed. The water is pressurized to expand the inner pipe. Thereafter, an induction heating unit is moved over the pipe unit and specially arranged to heat only the exterior pipe of the two telescoped pipes. The inner water chambers are further pressurized to expand and produce a bond therebetween or the firm engagement therebetween. A similar system is disclosed in U.S. Pat. No. 4,598,857 which issued on July 8, 1986. In this disclosure, after the induction heating, a mechanical working device is applied within the expanded exterior pipe and inner pipe to collapse the pipes to form a composite pipe. U.S. Pat. No. 3,579,805 which issued on May 25, 1971 discloses a system using freezing of the pipe unit to effect interengagement between the pipes of a multiple layered pipe unit. Other methods of forming composite dual walled pipes or multiple wall pipes are disclosed in the following U.S. patents:

| U.S. Pat. No. | Issue Date | Inventor |
| --- | --- | --- |
| 3,579,805 | 05-25-1971 | Kast |
| 4,030,711 | 06-21-1977 | Siller |
| 4,322,894 | 06-01-1982 | Whistler |
| 4,332,073 | 06-01-1982 | Yoshida |

Nothwithstanding, the activity and the efforts in the prior art in developing a multi-wall tubular member and pipe unit, the present systems are relatively costly and also have certain limitations which prevent long life operation.

SUMMARY OF THE PRESENT INVENTION

The present invention is particularly directed to the method of forming and fabricating a multi-wall composite tubular member particularly a dual wall pipe unit which has a long reliable life and is particularly adapted for commercial implementation. The present invention has been particularly developed in connection with concrete pumping systems and is correspondingly described in connection therewith for convenience and clarity of description, but is not limited in application thereby. Thus, the multiple wall piping method and the resulting product made in accordance with the present invention can be used in any other application requiring a hardened inner surface in combination with a high strength outer wall. Generally, in accordance with the present invention, the pipe or other tubular members are constructed or processed for relatively free and ready assembly of the member in superimposed relation. The inner member is then forcibly expanded outwardly a distance in excess of the interface gap to engage and simultaneously deform and expand the outer tubular member, thereby further expanding the outer walls to form a close and reasonably tight fit between the pipe or the members. An induction heating unit operating at a low frequency in contrast to the conventional high frequency is coupled to and moved relative to the expanded pipe subassembly and provides for progressive heating of relatively small lengths of the expanded pipe unit. Immediately after the heating, the expanded pipe unit is quenched with a suitable quenching liquid, and preferably a chilled brine solution applied to both surfaces. The brine solution provides a rapid interchange of heat and hardening of the inner liner, while application to both surfaces improves the hardening of the outer pipe wall. A slight hardening of the outer wall increases the material strength and results in an improved overall product.

More particularly, in a preferred and practical application of the present invention in the forming of a concrete pumping line members, the induction heating apparatus is specially constructed as a low frequency induction heating source. Generally, the unit operates in the range of low hundreds hertz in contrast to the conventional high frequency induction heating unit operating in thousands of hertz frequency such as heretofore suggested for use in forming of dual wall piping. With the unit operating at a low frequency, the induction unit can be mounted to the exterior of the multi-wall pipe and effectively progressively heat both the inner tubular member or pipe wall to the necessary temperature for quenching while effectively heating of the outer wall. The low frequency source also may be adapted to internal mounting and direct heating of the inner tubular member. The effectiveness of the internally located heating unit however is significantly effected by the length of the leads and thus is severely limited as to the length of the piping or tubular member formed and the frequency which can be used.

More particularly in a preferred construction of the present invention for commercial production of concrete pumping composite pipe sections and the like, an outer and inner pipes of essentially corresponding lengths are constructured, with the inner pipe of a significantly small outside diameter than the inside diameter of the outer pipe to permit the free assembly of the tube into alignment. A mechanical working mandrel is then forced through the aligned pipes while maintaining the longitudinal alignment. The working mandrel has the outer round diameter corresponding to the desired final diameter of the composite pipe section and serves to expand the inner pipe outwardly into tight engagement with the outer pipe, also expanding of the abutting pipes outwardly a further distance. The expansion of the pipes establishes a very firm and tight engagement between the interface surfaces which is essentially free of air gaps. The diameter of the member corresponding to the final desired diameter also provides the final sizing of the composite pipe section and establishes a true round inner passage. The expanded subassembly is then moved relative to an encircling heating coil to rapidly increase a short circumferential annular portion of only the inner pipe to the quenching temperature. The pipe section and coil unit are moved relative to each other in a continuous manner to progressively heat the pipe section over the axial length thereof. Immediately upon leaving of the coil unit at the quenching temperature, the inner and outer surfaces of the heat subassembly are subjected to the quenching liquid over the high temperature area on both the inner and outer surfaces of the heated pipe section. The quenched hardening of the inner pipe using the induction heating provides a greater hardness than that normally obtainable with a conventional furnace hardening system. The present invention also permits forming of the dual pipe in a single pass in contrast to sequential multi-step flame hardening and the like, avoiding the distortion which may occur on each of a plurality of heating passes. The single pass processing also creates an improved grain growth and minimizes cracking, as well as reducing the energy consumption and cost. Further, the present invention providing a continuous process permits rapid and effective forming of a composite tubular member with a hard inner lining or wall and high strength ductile outer wall.

The present invention provides a low cost method of forming a dual wall tubular member particularly adapted to high pressure applications such as encountered in concrete pumping and other similar high pressure applications. The process and product use conventional and.readily available technology thereby providing a highly cost efficient process and product which particularly adapts the present invention for commercial implementation.

BRIEF DESCRIPTION OF THE DRAWINGS

The drawings furnished herewith illustrate the best mode presently contemplated for carrying out the invention and are described hereinafter.

In the drawings:

FIG. 1 is side elevational view of a composite pipe unit constructed in accordance with the present invention and connected in a concrete pumping system, and with parts of the pipe unit broken away to more clearly illustrate the composite pipe unit constructed in accordance with the present invention;

FIG. 2 is an enlarged fragmentary view of a composite pipe unit of FIG. 1;

FIG. 3a is an enlarged longitudinal section of the apparatus shown in FIG. 3 with the pipe unit located and being subjected to the first step in the composite pipe forming process;

DESCRIPTION OF THE ILLUSTRATED EMBODIMENT

Figure 3:
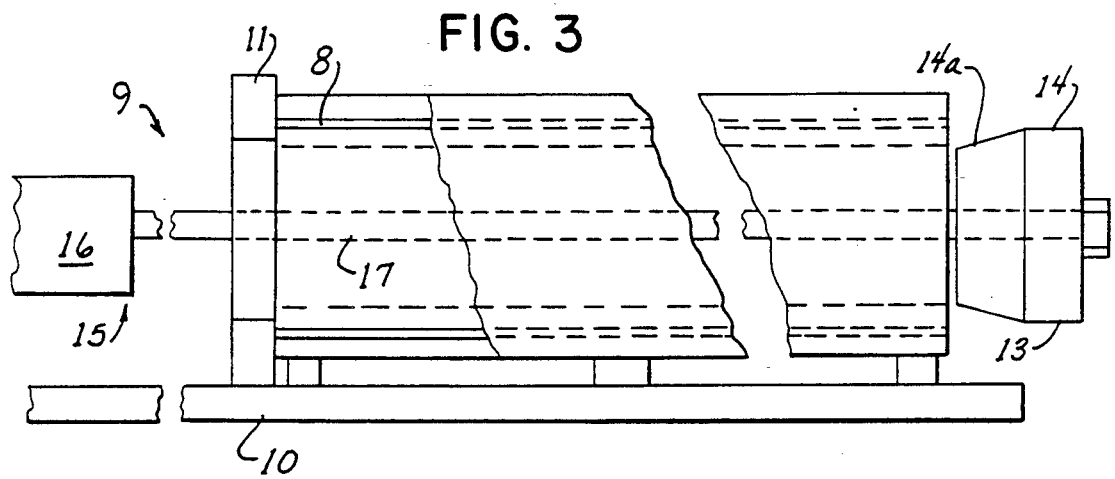
FIG. 3 is a side elevational view illustrating an initial step in assembly of the composite pipe unit with respect to a composite pipe forming apparatus.

Referring to the drawing and particularly to FIG. 1, composite dual wall pipe units 1 are illustrated connected in a concrete pumping system such as shown in the previously identified U.S. Pat. No. 3,860,175. A high pressure pump source 2 of concrete is mounted on the bed of a vehicle 2a for transport through a series of composite pipe units 1 and discharged at a discharged nozzle unit as at 3. The concrete source 2 introduces the concrete into the composite pipe units 1 under high pressure conditions and establish the high pressure flow through the pipe unit to the discharge end. In actual practice, the plurality of pipe units 1 are interconnected to each other and/or to other components with releasable couplings for pipe replacement. Such replacement is time consuming and costly, the pipe is costly and the demand for pipe sections and this and other concrete pumping systems having a long life is significant.

Generally as shown in FIGS. 2 and 3, each pipe unit 1, constructed in accordance with the present invention, includes an inner pipe 4 to form a liner which is abrasive resistant and an outer pipe 5 having a high strength. The pipes 4 and 5 are formed as a composite pipe unit with a tight and effective contiguous interface 6 between the pipes 4 and 5. The pipes are shown non-bonded in that there is no bonding element interposed within the interface. As more fully developed hereinafter, the inner pipe 4 is a hardened metal member to maintain high abrasive resistance to the effects of the flowing concrete and particularly its highly abrasive characteristic. The outer pipe 5 is a ductile steel member to maintain the necessary strength in the pipe unit 1. In a concrete pumping system, suitable carbon steels of slightly different carbon content have been used for the pipe units but any other material may obviously be used which will permit the forming of a hardened inner liner in combination with an appropriate characteristic outer shell.

Figure 4:
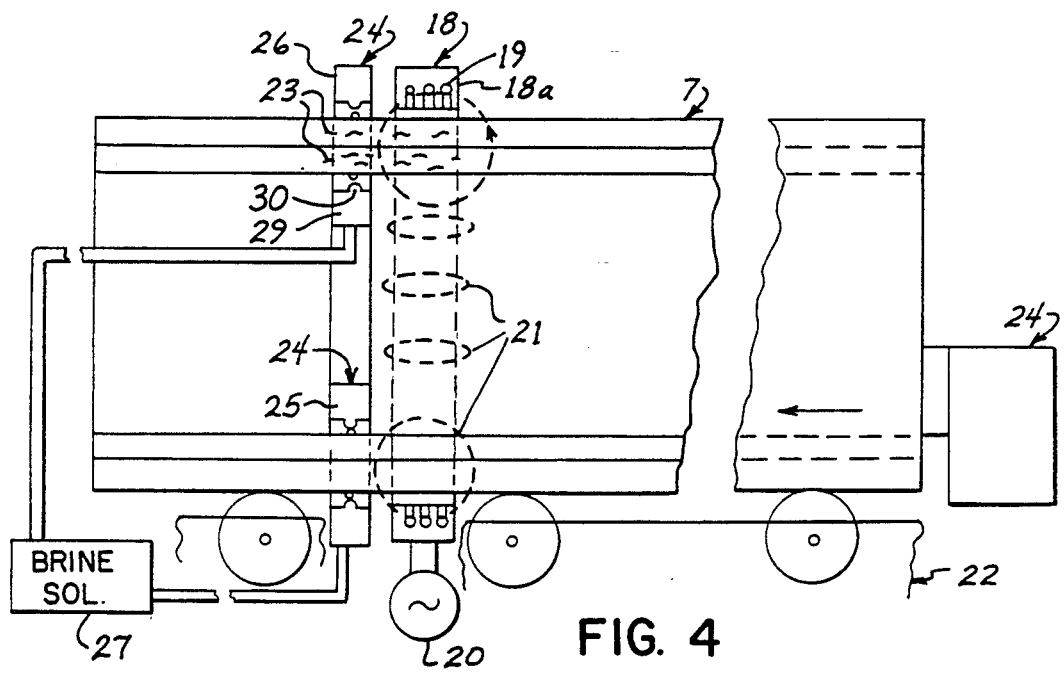
FIG. 4 is a view, similar to FIG. 3 illustrating a subsequent processing of the composite pipe unit to finalize and complete the forming of the composite pipe unit.

FIGS. 2-4 inclusive particularly illustrate one preferred mode and embodiment of carrying out the present invention, and which has been particularly found to produce an effective and reliable concrete pumping pipe unit 1.

Referring particularly to FIG. 2, the initial assembly of the pipes 4 and 5 for forming of the pipe unit 1 is illustrated. The pipes 4 and 5 are initially formed as standard ductile steel pipe, or of any other metal which can provide the required specification in the composite pipe unit and with the internal diameter of the outer pipe 5 slightly greater than the exterior diameter of the inner pipe 4, such that the inner pipe is conveniently and readily introduced and passed into alignment with the outer pipe. A small gap 8 exists between the assembled pipes. The loose sub-assembly 7 is supported within an expanding machine or apparatus 9 and positively held against axial or longitudinal pipe movement in the illustrated embodiment. The assembled pipes 4 and 5 are shown in a suitable rigid support 10 having an axial end abutment unit 11 for axially and longitudinally supporting the pipes in fixed position.

A mandrel 13 is located in coaxial alignment with the sub-assembly 7 within the expander apparatus 9. The mandrel 13 has a precisely formed cylindrical wall 14 corresponding to the desired final internal diameter of the composite pipe unit 1 and a tapered lead-in section 14a. A hydraulic positioner 15 is mounted to the machine support 10 to one end of pipe subassembly 7. The cylinder 16 of the actuator is fixedly mounted, with the piston rod 17 extending outwardly and rigidly affixed to the mandrel 13. The piston rod is movably axially through the location of the pipe sub-assembly 7 and is releasably connected to the mandrel 13 for assembly of the sub-assembly 7 within the support 10 and with mandrel 13. In the assembled position as shown in FIG. 3, the unit 14 is in the extended position with the mandrel 13 located immediately adjacent the one end of the sub-assembly 7 which is rigidly held in position. The hydraulic cylinder unit 15 is then actuated to retract the piston rod, thereby pulling the mandrel 13 through the pipe sub-assembly 7, as shown in FIG. 3a. The mandrel 13 mechanically works and forces the inner pipe 4 outwardly into inner engagement with the outer pipe 5. The mandrel has a diameter to work and deform both of the inner and outer pipes outwardly into an enlarged cylindrical configuration and preferably with a true constant diameter corresponding to the specified final configuration of the composite pipe unit 1. The mandrel 13 can readily work both of the metal pipes 4 and 5 in the ductile state of the pipes 4 and 5. The mandrel thus moves completely through the assembly to completely deform and shape the sub-assembly 7 to the desired final diameter configuration. The interaction of mechanically working and expanding both the inner and the outer pipe establishes an extreme tight interfit at the interface between the two pipes which is essentially. void of air gaps and the like.

The expanded sub-assembly 7 is placed in a suitable heat treating apparatus as shown in FIG. 4, which can be a separate machine as shown or incorporated into the expanding apparatus. The heat treating apparatus includes an induction heating unit 18 including an outer annular housing 18a. A heating coil 19, appropriately mounted within the cylindrical housing, establishes an annular alternating magnetic field within the opening of the housing. A low frequency power supply 20 is connected to the heating coil unit 19 to establish a low frequency field, as diagrammatically shown at 21, within the opening of the cylindrical housing. In forming a composite pipe unit 1 for concrete pumping a frequency of about 180 hertz was used, as hereinafter described. Although the particular frequency used is not critical, the frequency must be low and significantly less than 1000 hertz such has heretofore been used in heating of similar tubing for composite pipe. The low frequency allows the penetration to the inner pipe 4 for effective concentration of the heating effect.

A supporting track 22 of any suitable construction is located in alignment with the cylindrical housing. The supporting track 22 may include a series of supporting rollers 22a for proper pipe support. In a practical structure, eight rollers of a substantially larger diameter than shown supported a forty foot length of pipe. The expanded sub-assembly 7 is mounted on the track in co-axial alignment with the housing opening and thus centrally of the low frequency magnetic field generated by the induction heating unit 17. The length of the heating coil unit 19 is relatively short and thus provides alignment with a short portion of the sub-assembly 7. Energization of the coil unit 19 provides rapid heating of the small aligned area 23 of the inner pipe 4, corresponding generally to the axial length of the coil.

A drive unit 24 is coupled to the heating unit and the supporting track to establishing relative movement of the expanded sub-assembly 7 unit through the center of the heating unit 18 and therefor through the magnetic field created by the energization of the induction heating coil 19. The relative movement provides for a continuous progressive heating of small areas 23 of the inner pipe 4 of the sub-assembly 7. The low frequency field created by the coil unit 19 is such that the inner pipe 4 of the sub-assembly 7 is rapidly heated to the necessary hardening temperature such as 1600 degrees Fahrenheit (° F).

Immediately downstream of the induction heating unit 17, a quenching unit 24a is mounted. The quenching unit includes an inner solution nozzle 25 and an outer solution nozzle 26. Both nozzles are generally cylindrical ring members of a diameter respectively related to the internal diameter of the inner pipe 4 and the external diameter of the outer pipe 7 of the expanded sub-assembly 7 and therefore the composite pipe unit 1. The diameters are selected to space the respective nozzles 25 and 26 slightly from the inner and outer surfaces of the expanded pipe subassembly 7.

A quenching solution source 27 is mounted to the end of the machine support and connected by suitable flow lines 28 to the respective nozzles 25 and 26.

As the expanded pipe unit moves through the magnetic field 21, the heated area 23 is created and then passes directly from the induction heating unit 18 into alignment with the nozzles 25 and 26. The nozzles have similar radial discharge openings 29 extending inwardly and outwardly respectively. A quenching solution 30 is ejected from the nozzles 25 and 26 onto the heated area 23 to fully and rapidly quench the high temperature of the inner pipe heated areas 23, resulting in a ultra-hardening of the area 23. The inner pipe 4 is thereby fully hardened to develop the desired abrasive resistant inner wall of the composite pipe unit 1. The outer pipe 5 will be slightly hardened. It will however essentially retain a ductile state and maintain the necessary high tensile strength of composite unit 1 for operation in various high pressure applications. In accordance with known phenomena, the induction heated and quenched inner wall provides a hardness significantly greater than that obtained with a conventional furnace type or flame hardening. This results from the various factors such as residual stresses in the metal, a less retained austenite as well as appropriate carbon segregation.

More particularly, in forming a pipe unit 1, particularly adapted for and used in a truck mounted concrete pumping unit, the pipe sections consisted of an inner pipe of a 1040 carbon steel. The external diameter of the pipe in the original state was five inches with a wall thickness of 0.095 inches. The outer pipe 5 was formed of a 1020 carbon steel, and having an original outer diameter of 5.25 inches and a wall thickness of 0.095 inches. In the assembled state, it therefore developed a gap of approximately 0.155 inches. Such a gap permits the very simple and ready telescoped assembly of the inner and outer pipes to form sub-assembly 7. The mandrel had a forming diameter or cylinder wall of 4.92 inches corresponding to the internal diameter of the composite pipe unit 1. In one practical structure, the mandrel 13 had a constant diameter length 14 of about four inches with a gradual or inclined lead in portions 14a. The relative movement of the mandrel and the pipe sub-assembly 7 expands the sub-assembly 7, with the inner diameter of the inner pipe 4 expanding outwardly substantially 0.125 and the outer pipe 0.065 inches. Such expansion stretches the inner pipe 4 closing the gap, with the ductile outer pipe 5 stretched. The expanded ductile pipe sub-assembly 7 are then moved relatively through the short heating unit 18 and the immediately adjacent quenching unit 24. Energization of the heating coil 19 rapidly raises the inner carbon steel pipe to the 1600 degree Fahrenheit quenching temperature. As heated pipe unit moves from the heating unit, it is immediately subjected to the quenching solution 30. A brine solution is preferably used to establish a rapid heat transfer from the heated metal resulting in creation of an ultra hard inner wall located in effective integrated engagement with the outer high strength ductile pipe 5 for use in concrete pumping or other applications having similar strength and abrasive specifications. The present invention permits completing of the dual wall pipe in a single pass which produces an improved hardened pipe assembly as a result of minimizing of distortion, cracking and the like as well as minimizing the cost of manufacture. In addition, the induction heating enhance the physical engagement at the abutting interfaces of the two pipes 4 and 5. Thus, the inner pipe 4 grows more than the outer pipe 5 to create such improved interface engagement.

Figure 5:
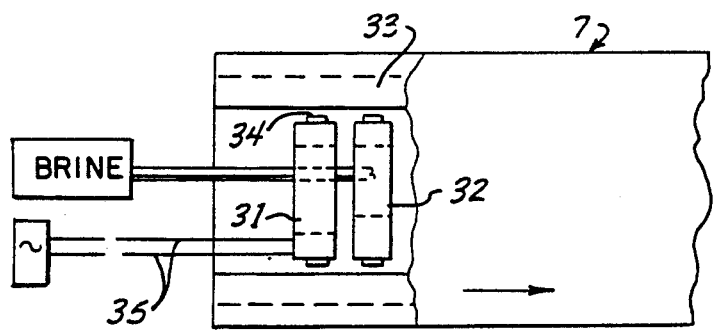
FIG. 5 is a view similar to FIG. 4 illustrating an alternate mode of carrying out the present invention.

Although the illustrated embodiment of the invention provides a practical and effective method for forming of the composite tubular unit, other apparatus including means for a mechanically working of the loosely assembled tubular members to establish an initial tight fit in combination with an induction heating unit for induction heating of only the inner pipe or wall tubular member may of course be used within the broad teaching of the present invention. Thus, as shown in FIG. 5 for example, an induction heating unit 31 can be mounted internally of a subassembly 32 with relative movement of the sub-assembly providing for progressive heating of successive short areas 33 of the pipe sub-assembly 32. Generally as in the previous embodiment, appropriate quenching nozzles 34 are located again immediately adjacent to the heating unit to provide the desired immediate quenching of the heated area 33. Inner and outer nozzles are preferably provided to produce the maximum hardness of the inner wall. Where the hardness specifications of the inner wall are of a lesser nature, only the inner nozzle could be used for purposes of quenching of the high temperature inner pipe. In this embodiment, a low frequency is also preferably used. The length of the power leads 35 to the induction heating unit 31 would have to be equal to the total length of the pipe sub-assembly. In high frequency systems, the leads cannot be practically extended. Thus, the length of the pipe section which could be hardened even using the low frequency of the present invention would limit pipe length which could be made. If a high frequency power supply could be made of a sufficiently small diameter to permit relative movement of the pipe and power supply with the power supply relatively moving through the internal diameter of the pipe, obviously, a high frequency supply could be used. As a practical matter, such power supplies are not presently available.

The present invention with present day technology is generally practically applied to smaller diameter tubular members. Thus, as described, the present invention is readily applied with great success in forming of pipes on the order of five inch diameters. Although larger diameter pipe units can be formed, special equipment would generally be necessary for tubular member having a diameter significantly above 10 inches or having a relatively heavy wall thickness because of the difficulty in effectively mechanically expanding such members. Thus, a 12 inch pipe with a wall thickness of 0.5 inches would require special equipment to process and form an expanded subassembly.

The present invention provides high strength tubular members having a hardened inner wall and a ductile high strength outer wall which can be commercially mass produced for high pressure applications requiring substantial flow such as in concrete pumping as well as other applications requiring a hardened inner steel wall.

Various modes of carrying out the invention are contemplated as being within the scope of the following claims and particularly pointing out and distinctly claiming the subject matter which is regarded as the invention.

I claim:

1. A method of forming a composite pipe unit having a hardened inner wall and a high strength ductile outer wall, comprising sequentially assembling first and second tubular members of a ductile metal in telescoped relation and thereby forming an inner tubular member and an outer tubular member, mechanically expanding said telescoped tubular member outwardly from within the inner tubular member and thereby establishing an expanded tubular sub-assembly with a tight and engaging interface between said tubular members, progressively and successively heating axially short portions of said expanded tubular sub-assembly including heating of said inner tubular member to a hardening temperature, and immediately after said heating each axially short portion quenching said heated portions of said inner tubular member to harden said inner tubular member.

2. The method of claim 1 wherein said heating of said axially short portions includes heating said short portions only once.

3. The method of claim 1 including heating of said outer tubular member to a hardening temperature and quenching said heated portions of said outer tubular member to harden said outer tubular member.

4. The method of claim 3 wherein said inner tubular member is hardened to a significantly greater degree than said outer tubular member.

5. In the method of claim 1 wherein said heating includes assembling an induction heating unit with said telescoped tubular members for establishing an annular induction heating field extending from the exterior of said sub-assembly inwardly into operative coupling to said inner tubular member, and including energizing of said induction heating unit at a frequency below 500 hertz to establish said induction heating field coupled to said inner tubular member and creating said hardening temperature.

6. The method of claim 5 wherein said heating unit includes a coil encircling said telescoped tubular members, and said energizing step including energizing said coil at a frequency of approximately 180 hertz.

7. The method of claim 5, wherein said tubular members have a first aligned end portion and a second aligned end portion spaced from said first end portion, and said induction heating field is passed over said sub-assembly from said first end portion to said second end portion of the tubular members in only one pass in forming of the composite pipe unit.

8. A method of forming a double wall composite pipe having a final inner diameter and an outer diameter, comprising telescoping a pair of tubular carbon steel pipes, said inner pipe having a higher carbon content than said outer pipe and having an outer diameter and having an inner diameter less than the inner diameter of said composite pipe, said outer pipe having an inner diameter greater than the outer diameter of the inner pipe and establishing a gap between said inner pipe and said outer pipe and said outer pipe having an outer diameter less than the outer diameter of said composite pipe, passing an expanding tool through the inner pipe, said expanding tool having an outer cylindrical rigid wall of a diameter corresponding to the final inner diameter of said composite pipe, said expanding tool being moved through said inner pipe and progressively expanding said inner pipe to close said gap and to simultaneously expand said inner and outer pipes outwardly to form a firm interfit between said inner and outer pipes and establish inner and outer diameters corresponding to said composite pipe, assembling an annular induction heating source for movement over said telescoped inner and outer pipes, energizing said source and generating an annular induction magnetic field with the source located on a diameter slightly greater than the outer diameter of said expanded sub-assembly and said magnetic field having a leading side and a trailing side, operating said field at approximately 180 hertz, creating an annular quenching flow of quenching fluid with an outer diameter slightly in excess of said expanded sub-assembly, said quenching flow being located immediately adjacent to the trailing side of said induction magnetic field, progressively moving said expanded sub-assembly through said induction magnetic field and then immediately through said quenching flow to progressively heat said inner pipe to at least 1600 degrees Fahrenheit and then substantially instantaneously applying said quenching flow to said heated sub-assembly thereby substantially hardening said inner pipe and thereby producing said high strength double wall composite pipe.

9. The method of the 8 wherein said outer pipe is a number 1020 carbon steel and said inner pipe is a 1040 carbon steel.

10. The method of claim 8 wherein said inner and outer pipes each have a thickness of approximately 0.095 inches.

11. The method of claim 10 wherein said tool is a solid metal member having an outer cylindrical surface corresponding to said final inner diameter for a length of approximately four inches and including a gradual inclined lead-in surface to provide for progressive expansion of said telescoped pipes to said desired final inner diameter and with said outer cylindrical surface located within each section of said pipe for a predetermined time thereby fixing said sub-assembly to said final inner diameter.

12. The method of the 11 wherein said telescoped inner and outer pipes are cold worked by said mandrel.

* * * * *